(12) United States Patent
Matsumi

(10) Patent No.: US 10,440,225 B2
(45) Date of Patent: Oct. 8, 2019

(54) IMAGE SCANNER

(71) Applicant: BROTHER KOGYO KABUSHIKI KAISHA, Nagoya-shi, Aichi-ken (JP)

(72) Inventor: Takashi Matsumi, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 16/216,050

(22) Filed: Dec. 11, 2018

(65) Prior Publication Data

US 2019/0191054 A1  Jun. 20, 2019

(30) Foreign Application Priority Data

Dec. 14, 2017 (JP) ................................ 2017-239367

(51) Int. Cl.
*H04N 1/00* (2006.01)
*H04N 1/401* (2006.01)

(52) U.S. Cl.
CPC ......... *H04N 1/401* (2013.01); *H04N 1/00551* (2013.01); *H04N 1/00835* (2013.01); *H04N 1/00997* (2013.01)

(58) Field of Classification Search
CPC ............................ H04N 1/401; H04N 1/00551
See application file for complete search history.

(56) References Cited

U.S. PATENT DOCUMENTS

| | | | |
|---|---|---|---|
| 2004/0239970 A1* | 12/2004 | Niitsuma | H04N 1/00681 358/1.9 |
| 2011/0043873 A1 | 2/2011 | Maruo | |
| 2011/0043874 A1* | 2/2011 | Saika | H04N 1/0071 358/475 |
| 2016/0248932 A1* | 8/2016 | Horiguchi | H04N 1/0408 |

FOREIGN PATENT DOCUMENTS

| | | |
|---|---|---|
| JP | H11-41424 A | 2/1999 |
| JP | 2007-028413 A | 2/2007 |
| JP | 2011-217339 A | 10/2011 |

* cited by examiner

*Primary Examiner* — Ibrahim Siddo
(74) *Attorney, Agent, or Firm* — Scully, Scott, Murphy & Presser, P.C.

(57) ABSTRACT

A circuit acquires, as white correction data, read image data generated by reading an image of a reference member when light of each of three colors of a light source is sequentially emitted to the reference member; acquires, as original document image data, the read image data generated by moving the image sensor and by reading, with an image sensor, an image of an original document; determines, as an original document non-existence position, a position of a pixel at which all of the original document image red, green, and blue data have a same value; converts the original document image data to output image data by performing shading correction on the original document image data based on white correction data; and replaces the output image data at the original document non-existence position with a value closer to data indicative of white color than a value of the output image data.

7 Claims, 10 Drawing Sheets

FIG. 10
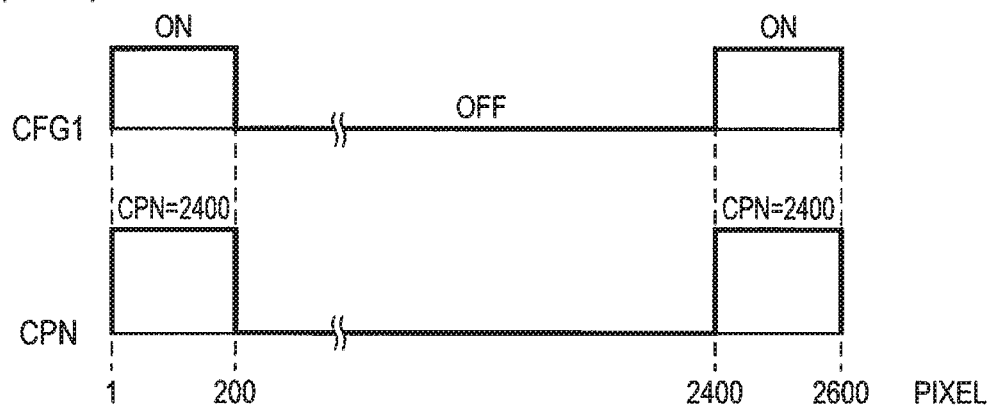
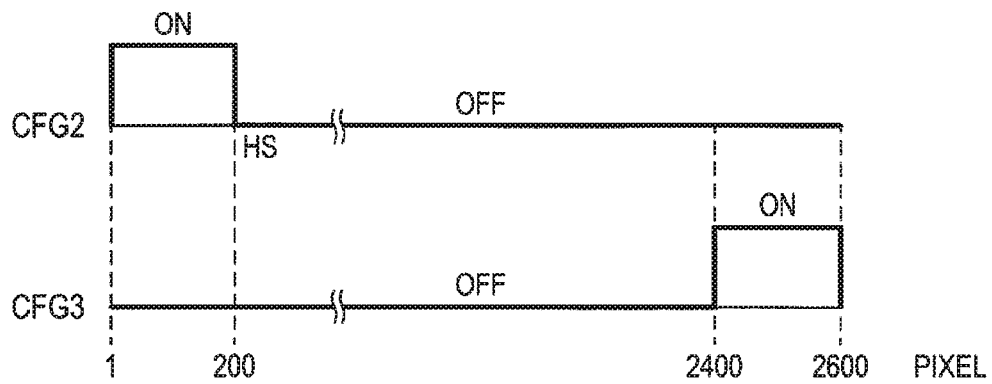

IMAGE SCANNER

CROSS REFERENCE TO RELATED APPLICATIONS

This application claims priority from Japanese Patent Application No. 2017-239367 filed Dec. 14, 2017. The entire content of the priority application is incorporated herein by reference.

TECHNICAL FIELD

This disclosure relates to an image scanner.

BACKGROUND

There is known an image scanner that reads an image of an original document for each scanning line by scanningly moving a line sensor in a state where a document cover for holding the original document is open.

When reading an image of an original document while the document cover is open, the above image scanner consecutively reads outside light and an image of an original document by controlling turn-on and turn-off of the light source for each scanning line. The image scanner generates outside light detection data from outside light image data read upon turn-off of the light source, and generates multi-valued image data from original document image data read upon turn-on of the light source. The image scanner reads the image of the original document upon removing the influence of the outside light by detecting the outside light and each end portion of the image of the original document from the outside light detection data and the multivalued image data and executing the mask processing of removing the influence of the outside light from the multivalued image data.

SUMMARY

According to one aspect, this specification discloses an image scanner. The image scanner includes a document table, a light source, an image sensor, a mover, a reference member, a memory, and a circuit. The document table is configured to support an original document. The light source is configured to emit light of each of three colors of red, green, and blue. The image sensor extends in a main scanning direction and is configured to receive light of at least one of the three colors emitted from the light source and to generate read image data that is pixel data of a plurality of pixels corresponding to at least one of the three colors. The mover is configured to move the image sensor along a sub-scanning direction perpendicular to the main scanning direction. The reference member has density serving as a reference of data indicative of white color. The circuit is configured to: acquire, as white correction data, the read image data that is generated by reading an image of the reference member when light of each of the three colors of the light source is sequentially emitted to the reference member and store the white correction data in the memory, the white correction data including red white correction data that is the read image data generated when red light of the light source is emitted to the reference member, green white correction data that is the read image data generated when green light of the light source is emitted to the reference member, and blue white correction data that is the read image data generated when blue light of the light source is emitted to the reference member; acquire, as original document image data, the read image data that is generated by moving the image sensor and by reading, with the image sensor, an image of the original document supported by the document table, the original document image data including original document image red data that is the read image data generated when red light of the light source is emitted to the original document, original document image green data that is the read image data generated when green light of the light source is emitted to the original document, and original document image blue data that is the read image data generated when blue light of the light source is emitted to the original document; determine, as an original document non-existence position, a position of a pixel at which all of the original document image red data, the original document image green data, and the original document image blue data have a same value; convert the original document image data to output image data by performing shading correction on the original document image data based on the white correction data stored in the memory, the output image data including output image red data that is obtained by performing shading correction on the original document image red data based on the red white correction data, output image green data that is obtained by performing shading correction on the original document image green data based on the green white correction data, and output image blue data that is obtained by performing shading correction on the original document image blue data based on the blue white correction data; and replace the output image data at the original document non-existence position with a value closer to the data indicative of white color than a value of the output image data.

BRIEF DESCRIPTION OF THE DRAWINGS

Embodiments in accordance with this disclosure will be described in detail with reference to the following figures wherein:

FIG. 10 shows one example of timing charts of equivalence flags CFG1, CFG2, and CFG3, and an equivalence pixel number CPN.

DETAILED DESCRIPTION

The above image scanner needs to turn off the light source to detect outside light, and hence requires an extra time to turn off the light source in addition to the time taken to read an image of an original document upon turning on the light source.

An example of an object of this disclosure is to provide an image scanner configured to detect outside light and remove the influence of outside light, without turning off the light source for detecting outside light.

Some aspects of this disclosure will be described while referring to the attached drawings.

<Configuration of Image Scanner SM>

Figure 1:
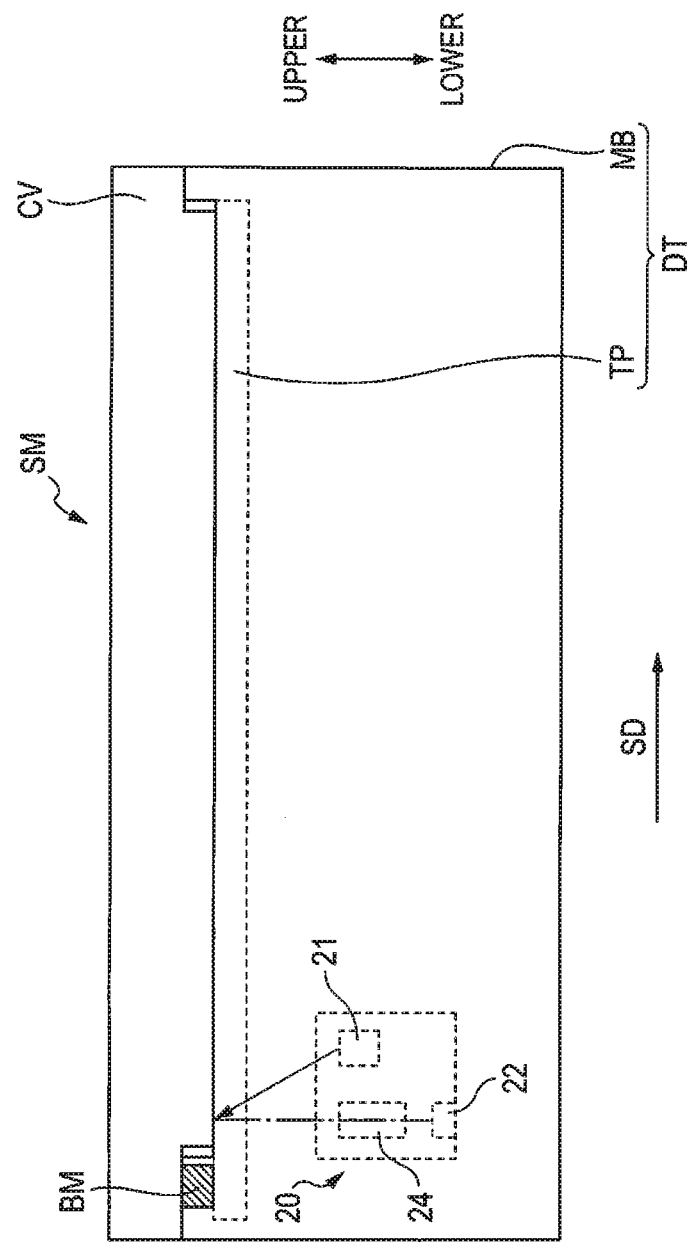
FIG. 1 is a view showing the internal configuration of an image scanner SM according to an embodiment of this disclosure.
Figure 2:
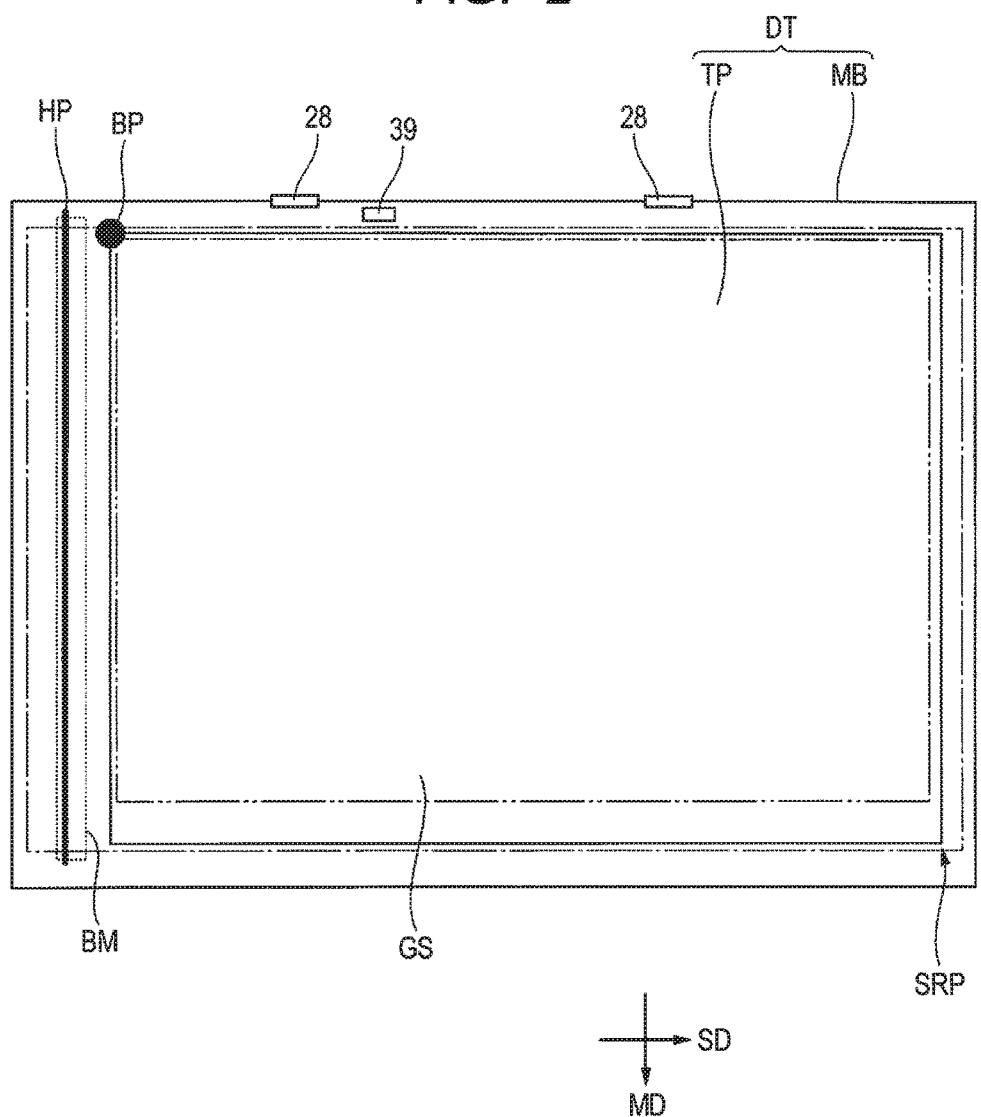
FIG. 2 is a top view of a document table DT.

The configuration of an image scanner SM according to this embodiment will be described with reference to the accompanying drawings. In the following description, the rightward direction in FIG. 1 is regarded as the downstream direction of a sub-scanning direction SD, the downward direction in FIG. 2 is regarded as the downstream direction of a main scanning direction MD, and the rightward direction in FIG. 2 is regarded as the downstream direction of the sub-scanning direction SD.

The image scanner SM includes a document table DT and a document cover CV. The document table DT includes a main body MB, a transparent plate TP, and a cover sensor 39. The main body MB is a housing that accommodates various members (for example, the transparent plate TP and a reader 20). As indicated by the single-dot chain line in FIG. 2, the transparent plate TP is housed in the main body MB and fixed to the main body MB. The transparent plate TP supports an original document GS of a reading target. The document cover CV includes pivot shafts 28 on the far side of the main body MB (the far side in the direction perpendicular to the drawing surface of FIG. 1 or the upper side in FIG. 2), and is opened or closed from the near side of the main body MB (the near side in the direction perpendicular to the drawing surface of the FIG. 1 or the lower side in FIG. 2). The cover sensor 39 is turned on in a closed state in which the document cover CV covers the document table DT, and is turned off in an open state in which the document cover CV does not cover the document table DT (the document table DT is exposed).

The image scanner SM further includes the reader 20 housed in the main body MB and located below the transparent plate TP. The reader 20 moves in a sub-scanning direction SD (that is, the lateral direction in FIG. 1) relative to the main body MB. The reader 20 executes reading operation of the original document GS supported on the transparent plate TP. The reader 20 is formed from a CIS (abbreviation of contact image sensor), and specifically includes a light source 21, a rod lens 24, and a light receiver 22. The light source 21 is constituted by red, green, and blue light-emitting diodes, and emits light toward the transparent plate TP. The rod lens 24 receives reflected light of light mainly emitted from the light source 21 and forms an image on the light receiver 22.

The light receiver 22 includes 2600 photoelectric conversion elements 23 arrayed in the main scanning direction MD, and incorporates an analog shift register and an amplifier (neither of which is shown). An output from each photoelectric conversion element 23 is the amount of light received at each pixel in the main scanning direction MD. The leading pixel of the photoelectric conversion elements 23 is the first pixel, which is located on the most upstream side in the main scanning direction MD shown in FIG. 2. The final pixel of the photoelectric conversion elements 23 is the 2600th pixel, which is located on the most downstream side in the main scanning direction MD shown in FIG. 2. In this embodiment, one line is a pixel group constituted by pixels ranging from the leading pixel to the final pixel in the main scanning direction MD. One reading line CL is a pixel group constituted by three lines respectively obtained by reading an original document with light of three colors of the light source 21.

Referring to FIG. 2, the upper surface of the document table DT includes the upper surface of the main body MB and a surface of the transparent plate TP which is exposed to the document cover CV. The main body MB has the pivot shafts 28 disposed on the upstream side in the main scanning direction MD. As indicated by the single-dot chain line in FIG. 2, the transparent plate TP has a rectangular shape constituted by long sides extending along the sub-scanning direction SD and short sides extending along the main scanning direction MD. Referring to FIG. 2, the solid line indicates the surface of the transparent plate TP which is exposed to the document cover CV (that is, the upper surface of the transparent plate TP). The original document GS is placed on the transparent plate TP with reference to a reference position BP as a base point. The pivot shafts 28 are shafts that pivot when the document cover CV is opened and closed, and are disposed at two positions on the upstream side in the main scanning direction MD of the main body MB.

The reference position BP is located at the most upstream position on the upper surface of the transparent plate TP in the main scanning direction MD and also located at the most upstream position in the sub-scanning direction SD. A reading end position SRP is located at the most downstream position on the upper surface of the transparent plate TP in the sub-scanning direction. The image scanner SM reads an image of the original document GS across the range from the reference position BP in the sub-scanning direction SD to the reading end position SRP as a reading range. The reference position BP in the sub-scanning direction SD is the position of the leading line in the sub-scanning direction SD.

The image scanner SM further includes a reference member BM fixed on the upper surface of the transparent plate TP. The reference member BM is provided on an end portion of the transparent plate TP which is located on the upstream side (that is, the left side in FIG. 2) in the sub-scanning direction SD. The reference member BM is a white member with a reference density extending along the main scanning direction MD. The reference member BM is read to acquire first color white correction data C1WD, second color white correction data C2WD, and third color white correction data C3WD in processing RA3, processing RA4, and processing RA5 in initialization processing R1 (to be described later). A home position HP is a position on the reference member BM in the sub-scanning direction SD. The reader 20 is configured to move along the sub-scanning direction SD by using the home position HP as the reference position.

<Electrical Configuration of Image Scanner SM>

Figure 3:
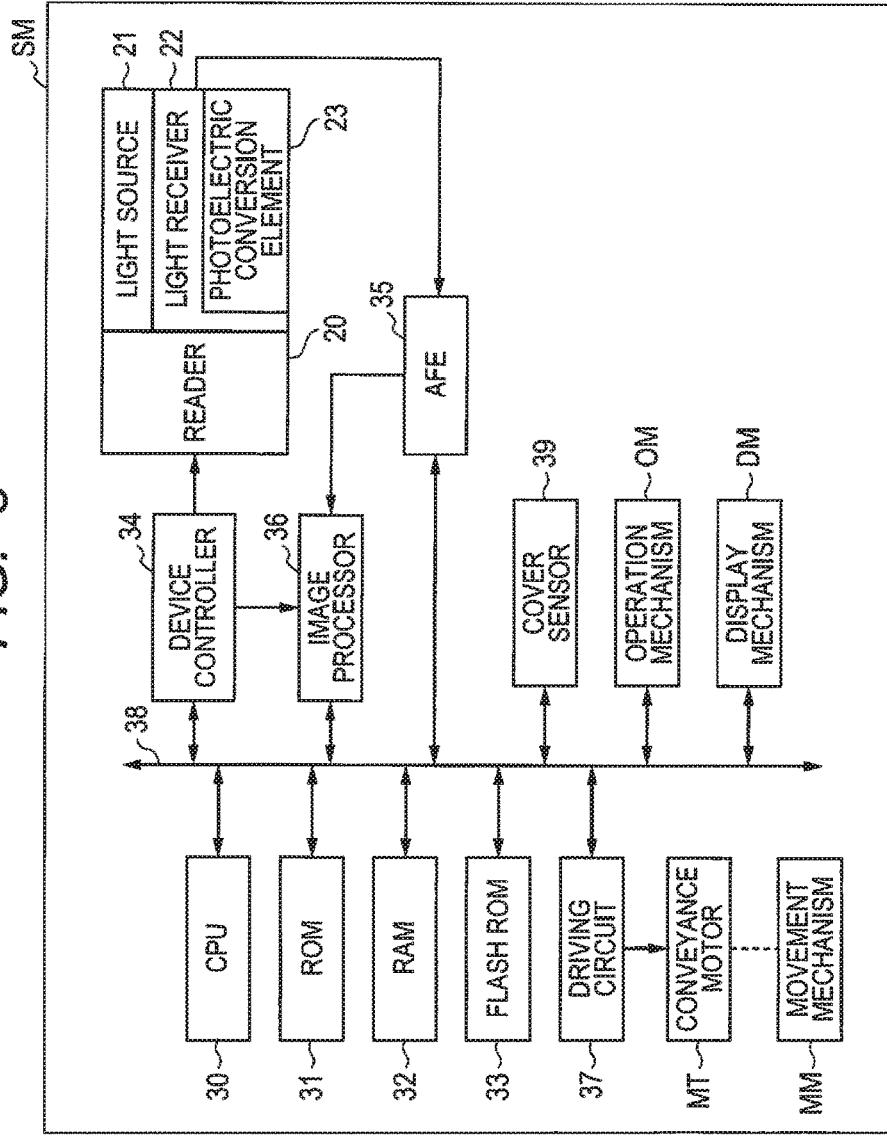
FIG. 3 is a block diagram showing the electrical configuration of the image scanner SM.

The electrical configuration of the image scanner SM will be described with reference to FIGS. 3, 4, and 5. Referring to FIG. 3, the image scanner SM includes, as main constituent elements, a CPU 30, a ROM 31, a RAM 32, a flash ROM 33, a device controller 34, an analog front end (hereinafter referred to as an AFE) 35, an image processor 36, and a driving circuit 37. These constituent elements are connected to an operation mechanism OM, a display mechanism DM, and the cover sensor 39 through a bus 38. The operation mechanism OM is constituted by a plurality of keys such as a start button and a determination button. A user operates the operation mechanism OM to input various instructions to the image scanner SM. The display mechanism DM is a display for displaying various types of information. The cover sensor 39 is turned on when the document cover CV is in a closed state, and turned off when the document cover CV is in an open state.

The ROM 31 stores programs for allowing the image scanner SM to execute various operations such as reading main processing (to be described later) and sub-routine processing in each main processing. The CPU 30 controls the respective units in accordance with programs read out from the ROM 31. The flash ROM 33 is a reprogrammable nonvolatile memory, and stores various data generated by control processing by the CPU 30, various types of data acquired by, for example, reading main processing. The RAM 32 temporarily stores, for example, the calculation results generated by control processing by the CPU 30.

The device controller 34 is connected to the reader 20 and the image processor 36, and transmits various signals based on instructions from the CPU 30. Specifically, based on instructions from the CPU 30, the device controller 34 transmits, to the light source 21, a signal for controlling turn-on or turn-off of the light source 21 and a signal for controlling a current value flowing in the light source 21. Based on instructions from the CPU 30, the device controller 34 transmits, to the light receiver 22, a serial-in signal SI for simultaneously transferring electrical signals from a large number of photoelectric conversion elements 23 to a shift register and a clock signal CLK for sequentially outputting electrical signals from the shift register. Based on an instruction from the CPU 30, the device controller 34 transmits the serial-in signal SI to the image processor 36. In response to input of these signals from the device controller 34, the reader 20 turns on the light source 21 and transmits, to the AFE 35, analog signals corresponding to the amounts of light received by the light receiver 22 in the order from the leading pixel to the final pixel. This embodiment is configured to transmit, to the image processor 36, the same signal as the serial-in signal SI transmitted to the reader 20. However, another type of signal may be transmitted as long as the signal has the same cycle as the serial-in signal SI.

The AFE 35 is connected to the reader 20, and converts an analog signal transmitted from the reader 20 into digital data DD based on an instruction from the CPU 30. The AFE 35 has a particular input range and resolution. For example, the resolution corresponds to gradations from "0" to "1023" in terms of 10 bits. In this case, the AFE 35 converts an analog signal transmitted from the reader 20 into gradation data of 10 bits (0 to 1023) as the digital data DD. The digital data converted by the AFE 35 is transmitted to the image processor 36 and stored in the RAM 32.

The driving circuit 37 is connected to a conveyance motor MT, and drives the conveyance motor MT based on a drive command transmitted from the CPU 30. The driving circuit 37 rotates the conveyance motor MT in accordance with a rotation amount and a rotation direction commanded by a drive command. When the conveyance motor MT rotates by a particular amount, a movement mechanism MM rotates by a particular angle to convey the reader 20 by a particular distance in the sub-scanning direction SD.

Figure 4:
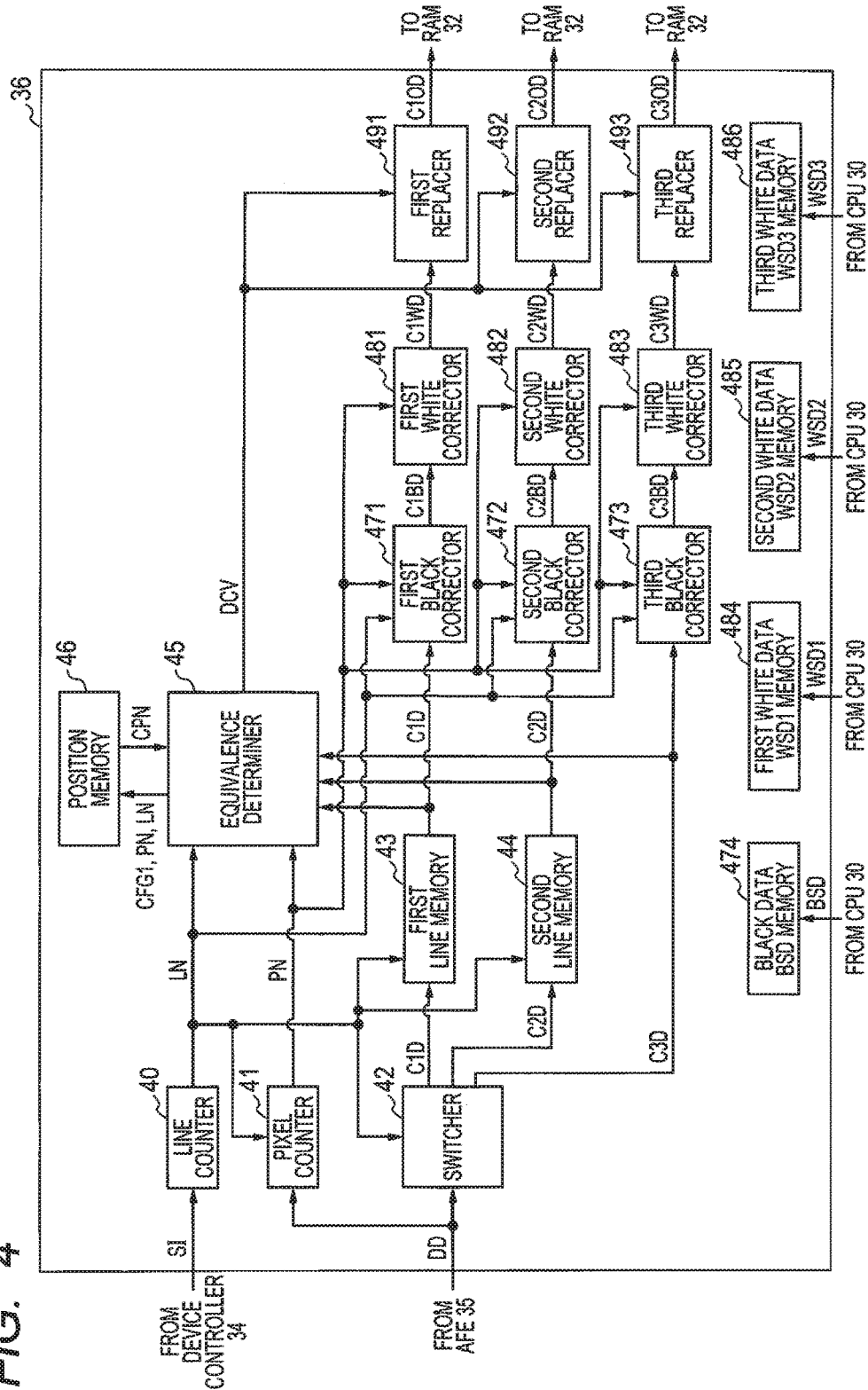
FIG. 4 is a block diagram showing the electrical configuration of an image processor 36.

As shown in FIG. 4, the image processor 36 includes a line counter 40, a pixel counter 41, a switcher 42, a first line memory 43, a second line memory 44, an equivalence determiner 45, a position memory 46, black correctors 471, 472, 473, and 474, white correctors 481, 482, 483, 484, 485, and 486, and replacers 491, 492, and 493. The black correctors include the first black corrector 471, the second black corrector 472, the third black corrector 473, and the black data BSD memory 474. The white correctors include the first white corrector 481, the second white corrector 482, the third white corrector 483, the first white data WSD1 memory 484, the second white data WSD2 memory 485, and the third white data WSD3 memory 486. The replacers include the first replacer 491, the second replacer 492, and the third replacer 493.

The line counter 40 transmits a line count number LN obtained by counting based on the serial-in signal SI to the equivalence determiner 45, the first black corrector 471, the second black corrector 472, the third black corrector 473, the pixel counter 41, the switcher 42, the first line memory 43, and the second line memory 44. Specifically, in response to input of the serial-in signal SI from the device controller 34 when the line count number LN is "0" to "2," the line counter 40 adds "1" to the line count number LN. In response to input of the serial-in signal SI from the device controller 34 when the line count number LN is "3," the line counter 40 sets the line count number LN to "1". When "1" is added to the line count number LN or "1" is set to the line count number LN, the line counter 40 transmits the line count number LN to the equivalence determiner 45, the first black corrector 471, the second black corrector 472, the third black corrector 473, the pixel counter 41, the switcher 42, the first line memory 43, and the second line memory 44. In this embodiment, the line count number LN to be transmitted is "1," "2," or "3."

In response to input of the digital data DD, the pixel counter 41 adds "1" to a pixel number PN, and transmits the pixel number PN to which "1" is added to the equivalence determiner 45, the first black corrector 471, the second black corrector 472, the third black corrector 473, the first white corrector 481, the second white corrector 482, and the third white corrector 483. Specifically, in response to input of the line count number LN from the line counter 40, the pixel counter 41 sets the pixel number PN to "0". In response to input of the digital data DD from the AFE 35, the pixel counter 41 adds "1" to the pixel number PN, and transmits the pixel number PN to which "1" is added to the equivalence determiner 45, the first black corrector 471, the second black corrector 472, the third black corrector 473, the first white corrector 481, the second white corrector 482, and the third white corrector 483.

In response to input of the digital data DD, the switcher 42 transmits the digital data DD as first color data C1D, second color data C2D, or third color data C3D to the first line memory 43, the second line memory 44, or the third black corrector 473 and the equivalence determiner 45 which are switched based on the line count number LN. Specifically, in response to input of the digital data DD from the AFE 35 when the line count number LN input from the line counter 40 is "1," the switcher 42 transmits the digital data DD input from the AFE 35 as the first color data C1D to the first line memory 43. In response to input of the digital data DD from the AFE, 35 when the line count number LN input from the line counter 40 is "2," the switcher 42 transmits the digital data DD input from the AFE 35 as the second color data C2D to the second line memory 44. In response to input of the digital data DD from the AFE 35 when the line count number LN input from the line counter 40 is "3," the switcher 42 transmits the digital data DD input from the AFE, 35 as the third color data C3D to the third black corrector 473 and the equivalence determiner 45.

In response to input of the first color data C1D, the first line memory 43 stores the first color data C1D according to the input order. Specifically, in response to input of "1" as the line count number LN from the line counter 40, the first line memory 43 deletes the stored first color data C1D. In response to input of the first color data C1D from the switcher 42 after deleting the first color data C1D, the first line memory 43 stores the first color data C1D according to the input order.

In response to input of the second color data C2D, the second line memory 44 stores the second color data C2D according to the input order. Specifically, in response to input of "2" as the line count number LN from the line counter 40, the second line memory 44 deletes the stored second color data C2D. In response to input of the second color data C2D from the switcher 42 after deleting the second color data C2D, the second line memory 44 stores the second color data C2D according to the input order.

In response to input of the pixel number PN when the input line count number LN is "3," the first black corrector 471 performs black correction on the first color data C1D to obtain first color black correction data C1BD based on black data BSD. Specifically, in response to input of the pixel number PN when the input line count number LN is "3," the first black corrector 471 acquires the first color data C1D of the pixel corresponding to the input pixel number PN from the first line memory 43, and acquires the black data BSD of the pixel corresponding to the input pixel number PN from the black data BSD memory 474. The first black corrector 471 then subtracts the acquired black data BSD from the acquired first color data C1D to perform black correction on the first color data C1D to obtain the first color black correction data C1 BD, and transmits the first color black correction data C1BD having undergone the black correction to the first white corrector 481. In this case, when, for example, the pixel number PN is "1," the pixel corresponding to the input pixel number PN is the first pixel input to each memory.

In response to input of the pixel number PN when the input line count number LN is "3," the second black corrector 472 performs black correction on the second color data C2D to obtain second color black correction data C2BD based on black data BSD. Specifically, in response to input of the pixel number PN when the input line count number LN is "3," the second black corrector 472 acquires the second color data C2D of the pixel corresponding to the input pixel number PN from the second line memory 44, and acquires the black data BSD of the pixel corresponding to the input pixel number PN from the black data BSD memory 474. The second black corrector 472 then subtracts the acquired black data BSD from the acquired second color data C2D to perform black correction on the second color data C2D to obtain the second color black correction data C2BD, and transmits the second color black correction data C2BD having undergone the black correction to the second white corrector 482.

In response to input of the pixel number PN when the input line count number LN is "3," the third black corrector 473 performs black correction on the third color data C3D to obtain third color black correction data C3BD based on black data BSD. Specifically, in response to input of the pixel number PN when the input line count number LN is "3," the third black corrector 473 acquires the black data BSD of the pixel corresponding to the input pixel number PN from the black data BSD memory 474. The third black corrector 473 then subtracts the acquired black data BSD from the input third color data C3D to perform black correction on the third color data C3D to obtain the third color black correction data C3BD, and transmits the third color black correction data C3BD having undergone the black correction to the third white corrector 483.

In response to input of the first color black correction data C1BD, the first white corrector 481 performs white correction on the first color black correction data C1BD to obtain the first color white correction data C1WD based on first white data WSD1. Specifically, in response to input of the first color black correction data C1BD from the first black corrector 471, the first white corrector 481 acquires the first white data WSD1 of the pixel corresponding to the pixel number PN input from the pixel counter 41 from the first white data WSD1 memory 484. The first white corrector 481 performs white correction on the first color black correction data C1BD input from the first black corrector 471 to obtain the first color white correction data C1WD by multiplying the first color black correction data C1BD by a white value WD and dividing the product by the acquired first white data WSD1. The first white corrector 481 transmits the first color white correction data C1WD having undergone the white correction to the first replacer 491. In this embodiment, the white value WD is "1023" that is the maximum value of 10 bits.

In response to input of the second color black correction data C2BD, the second white corrector 482 performs white correction on the second color black correction data C2BD to obtain the second color white correction data C2WD based on second white data WSD2. Specifically, in response to input of the second color black correction data C2BD from the second black corrector 472, the second white corrector 482 acquires the second white data WSD2 of the pixel corresponding to the pixel number PN from the second white data WSD2 memory 485. The second white corrector 482 performs white correction on the second color black correction data C2BD input from the second black corrector 472 to obtain the second color white correction data C2WD by multiplying the second color black correction data C2BD by the white value WD and dividing the product by the second white data WSD2. The second white corrector 482 transmits the second color white correction data C2WD having undergone the white correction to the second replacer 492.

In response to input of the third color black correction data C3BD, the third white corrector 483 performs white correction on the third color black correction data C3BD to the third color white correction data C3WD based on third white data WSD3. Specifically, in response to input of the third color black correction data C3BD from the third black corrector 473, the third white corrector 483 acquires the third white data WSD3 of the pixel corresponding to the pixel number PN from the third white data WSD3 memory 486. The third white corrector 483 performs white correction on the third color black correction data C3BD input from the third black corrector 473 to obtain the third color white correction data C3WD by multiplying the third color black correction data C3BD by the white value WD and dividing the product by the third white data WSD3. The third white corrector 483 transmits the third color white correction data C3WD having undergone the white correction to the third replacer 493.

In response to input of the first color white correction data C1WD, the first replacer 491 stores first color output data C1OD in the RAM 32. Specifically, in response to input of the first color white correction data C1WD from the first white corrector 481 when a replacement correction value DCV is input from the equivalence determiner 45, the first replacer 491 stores the replacement correction value DCV as the first color output data C1OD in the RAM 32, whereas when no replacement correction value DCV is input from the equivalence determiner 45, the first replacer 491 stores the first color white correction data C1WD as the first color output data C1OD in the RAM 32.

In response to input of the second color white correction data C2WD, the second replacer 492 stores second color output data C2OD in the RAM 32. Specifically, in response to input of the second color white correction data C2WD from the second white corrector 482 when the replacement correction value DCV is input from the equivalence determiner 45, the second replacer 492 stores the replacement correction value DCV as the second color output data C2OD in the RAM 32, whereas when no replacement correction value DCV is input from the equivalence determiner 45, the second replacer 492 stores the second color white correction data C2WD as the second color output data C2OD in the RAM 32.

In response to input of the third color white correction data C3WD, the third replacer 493 stores third color output data C3OD in the RAM 32. Specifically, in response to input of the third color white correction data C3WD from the third white corrector 483 when the replacement correction value DCV is input from the equivalence determiner 45, the third replacer 493 stores the replacement correction value DCV as the third color output data C3OD in the RAM 32, whereas when no replacement correction value DCV is input from the equivalence determiner 45, the third replacer 493 stores the third color white correction data C3WD as the third color output data C3OD in the RAM 32.

Figure 5:
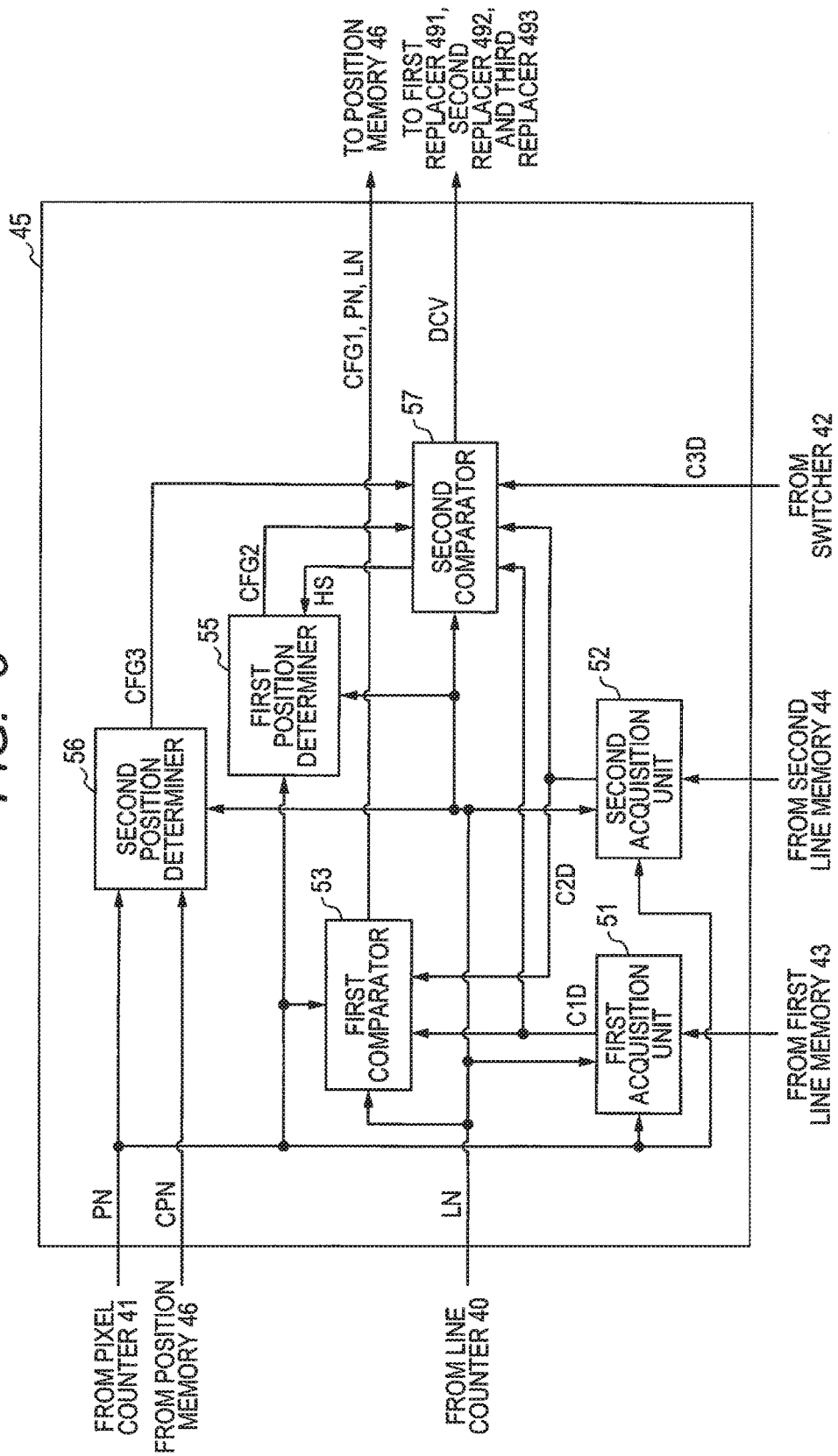
FIG. 5 is a block diagram showing the electrical configuration of an equivalence determiner 45.

As shown in FIG. 5, the equivalence determiner 45 includes a first acquisition unit 51, a second acquisition unit 52, a first position determiner 55, a second position determiner 56, a first comparator 53, and a second comparator 57. In response to input of the pixel number PN when the input line count number LN is "2," the equivalence determiner 45 turns on or off a first equivalence flag CFG1 based on the processing results obtained by the first comparator 53, and transmits the first equivalence flag CFG1, the pixel number PN, and the line count number LN to the position memory 46. In response to input of the pixel number PN when the input line count number LN is "3," the equivalence determiner 45 transmits the replacement correction value DCV to the replacers 491, 492, and 493 based on the processing results obtained by the second comparator 57. Since the equivalence determiner 45 performs different types of processing depending on whether the line count number LN is "2" or "3," the operations of the equivalence determiner 45 and the position memory 46 will be described separately in one case where the line count number LN is "2" and in another case where the line count number LN is "3."

The operations of the equivalence determiner 45 and the position memory 46 when the line count number LN is "2" will be described. In response to input of the pixel number PN from the pixel counter 41 when the line count number LN input from the line counter 40 is "2," the first acquisition unit 51 acquires the first color data C1D of the pixel corresponding to the pixel number PN from the first line memory 43, and transmits the acquired first color data C1D to the first comparator 53.

In response to input of the pixel number PN from the pixel counter 41 when the line count number LN input from the line counter 40 is "2," the second acquisition unit 52 acquires the second color data C2D of the pixel corresponding to the pixel number PN from the second line memory 44, and transmits the acquired second color data C2D to the first comparator 53.

In response to input of the pixel number PN from the pixel counter 41 when the line count number LN input from the line counter 40 is "2," the first comparator 53 turns on the first equivalence flag CFG1 when the first color data C1D input from the first acquisition unit 51 has the same value as the second color data C2D input from the second acquisition unit 52, and transmits the first equivalence flag CFG1, the pixel number PN, and the line count number LN to the position memory 46. In response to input of the pixel number PN from the pixel counter 41 when the line count number LN input from the line counter 40 is "2," the first comparator 53 turns off the first equivalence flag CFG1 when the first color data C1D input from the first acquisition unit 51 has a different value from the second color data C2D input from the second acquisition unit 52, and transmits the first equivalence flag CFG1, the pixel number PN, and the line count number LN to the position memory 46.

In response to input of the "ON" first equivalence flag CFG1 from the equivalence determiner 45 when the line count number LN input from the equivalence determiner 45 is "2" and when an equivalence pixel number CPN is not stored in a memory area of the position memory 46, the position memory 46 stores the pixel number PN input from the equivalence determiner 45 as an equivalence pixel number CPN in the memory area of the position memory 46. When the equivalence pixel number CPN is stored in the memory area of the position memory 46, the position memory 46 maintains the stored equivalence pixel number CPN in the memory area of the position memory 46. In response to input of the "OFF" first equivalence flag CFG1 from the equivalence determiner 45 when the line count number LN input from the equivalence determiner 45 is "2," the position memory 46 deletes the stored equivalence pixel number CPN from the memory area of the position memory 46. In this embodiment, as described above, in response to input of the "ON" first equivalence flag CFG1 when the line count number LN is "2," the input pixel number PN is stored if the equivalence pixel number CPN is not stored. If the equivalence pixel number CPN is stored, the equivalence pixel number CPN is maintained to store, as the equivalence pixel number CPN, the smallest pixel number PN of a group of pixels, including the final pixel, each of which has the first color data C1D and the second color data C2D has the same value. This allows the second comparator 57 (to be described later) to quickly execute processing.

The operation of the equivalence determiner 45 when the line count number LN is "3" will be described below. In response to input of the pixel number PN from the pixel counter 41 when the line count number LN input from the line counter 40 is "3," the first acquisition unit 51 acquires the first color data C1D of the pixel corresponding to the pixel number PN from the first line memory 43, and transmits the acquired first color data C1D to the second comparator 57.

In response to input of the pixel number PN from the pixel counter 41 when the line count number LN input from the line counter 40 is "3," the second acquisition unit 52 acquires the second color data C2D of the pixel corresponding to the pixel number PN from the second line memory 44, and transmits the acquired second color data C2D to the second comparator 57.

When the line count number LN is "3," the first position determiner 55 turns on a second equivalence flag CFG2 and transmits the second equivalence flag CFG2 to the second comparator 57 after the pixel number PN of "1" is input from the pixel counter 41 and until a stop signal HS (a stop command) is input from the second comparator 57. When the line count number LN is "3," the first position determiner 55 turns off the second equivalence flag CFG2 and transmits the second equivalence flag CFG2 to the second comparator 57 after the stop signal HS is input from the second comparator 57 and until the pixel number PN of "2600" is input from the pixel counter 41. In this embodiment, the pixel corresponding to the pixel number PN of "2600" is the final pixel.

In response to input of the pixel number PN when the line count number LN is "3," the second position determiner 56 acquires the equivalence pixel number CPN from the position memory 46. The second position determiner 56 turns on a third equivalence flag CFG3 and transmits the third equivalence flag CFG3 to the second comparator 57 after the pixel number PN of the acquired equivalence pixel number CPN is input and until the pixel number PN of "2600" is input from the pixel counter 41. The second position determiner 56 turns off the third equivalence flag CFG3 and transmits the third equivalence flag CFG3 to the second comparator 57 after the pixel number PN of "1" is input from the pixel counter 41 and until the pixel number PN of the equivalence pixel number CPN is input from the pixel counter 41. In this embodiment, the pixel corresponding to the pixel number PN of "2600" is the final pixel.

While the second equivalence flag CFG2 or the third equivalence flag CFG3 is ON and the line count number LN input from the line counter 40 is "3," in response to input of the pixel number PN from the pixel counter 41, the second comparator 57 transmits "1023" that is the white value WD as the replacement correction value DCV to the first replacer 491, the second replacer 492, and the third replacer 493 when the first color data C1D input from the first acquisition unit 51, the second color data C2D input from the second acquisition unit 52, and the third color data C3D input from the switcher 42 all have the same value. In response to input of the pixel number PN from the pixel counter 41, the second comparator 57 does not transmit the replacement correction value DCV when the second equivalence flag CFG2 and the third equivalence flag CFG3 are OFF, the line count number LN input from the line counter 40 is not "3," or at least two of the first color data C1D input from the first acquisition unit 51, the second color data C2D input from the second acquisition unit 52, and the third color data C3D input from the switcher 42 have different values. The second comparator 57 transmits the stop signal HS to the first position determiner 55 when the second equivalence flag CFG2 is ON, the line count number LN input from the line counter 40 is "3," and at least two of the first color data C1D input from the first acquisition unit 51, the second color data C2D input from the second acquisition unit 52, and the third color data C3D input from the switcher 42 have different values.

<Operation of Image Scanner SM>
<Reading Main Processing>

Next, the operation of the image scanner SM will be described with reference to the accompanying drawings. The image scanner SM mainly executes reading main processing of reading the original document GS. Processing R1 to processing R4 in the reading main processing shown in FIG. 6 are executed by the CPU 30.

Figure 6:
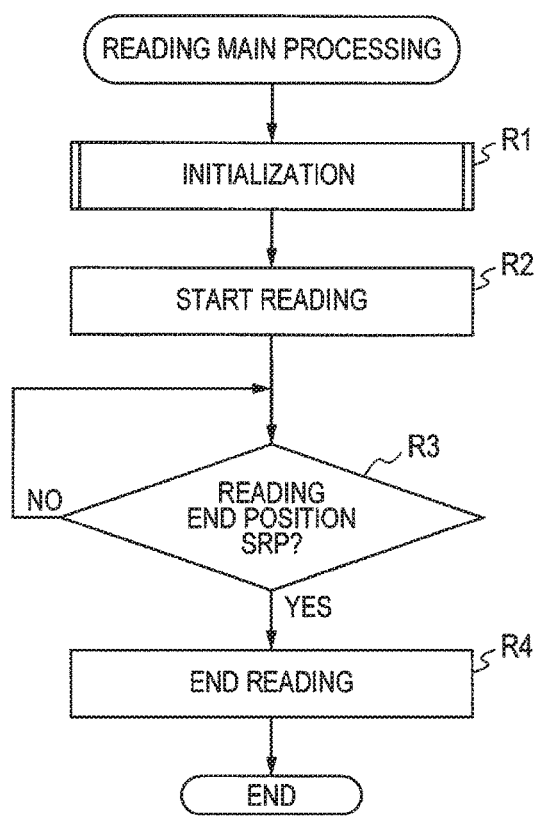
FIG. 6 is a flowchart showing reading main processing.

A user starts the reading main processing shown in FIG. 6 by placing the original document GS on the transparent plate TP, setting the document cover CV in the open state, and pressing a reading start button of the operation mechanism OM. That is, the CPU 30 starts reading main processing in response to input of a command issued by pressing of the reading start button when the cover sensor 39 is OFF.

The CPU 30 executes initialization processing (R1). Details of this processing will be described later and an outline of the processing will be described below. The CPU 30 sets initial values in the device controller 34, the AFE, 35, and the image processor 36. The CPU 30 acquires the black data BSD, the first white data WSD1, the second white data WSD2, and the third white data WSD3.

The CPU 30 starts a reading operation (R2). Specifically, the CPU 30 transmits a drive command to the driving circuit 37 to move the reader 20 to the reference position BP. The CPU 30 transmits commands to the driving circuit 37 and the device controller 34 to start the reading operation of reading the original document GS while moving the reader 20 from the reference position BP to a downstream position along the sub-scanning direction SD. Upon starting the reading operation, the AFE 35 outputs the digital data DD to the image processor 36. The image processor 36 then stores the first color output data C1OD, the second color output data C2OD, and the third color output data C3OD in the RAM 32. Each data is output in the order from data of the leading pixel to data of the final pixel.

The CPU 30 determines whether the reader 20 is located at the reading end position SRP (R3). If the reader 20 is located at the reading end position SRP (R3: Yes), the CPU 30 advances to the processing R4. If the reader 20 is not located at the reading end position SRP (R3: No), the CPU 30 continues the reading operation.

The CPU 30 ends the reading operation (R4). Specifically, the CPU 30 transmits commands to the driving circuit 37 and the device controller 34 to move the reader 20 to the home position HP after ending the reading operation of reading the original document GS and stop driving the reader 20. When the processing R4 ends, the reading main processing ends.

<Initialization Processing R1>

Figure 7:
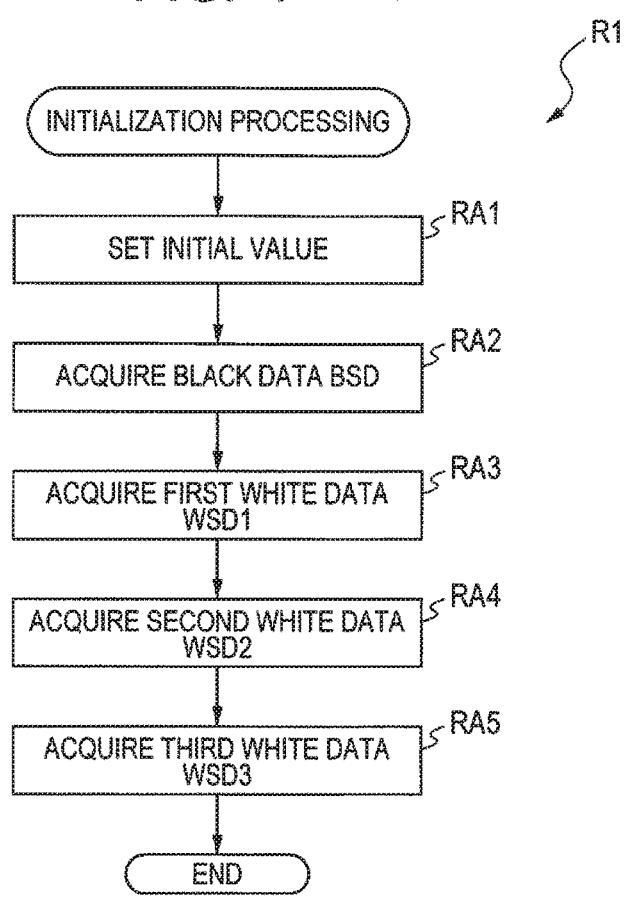
FIG. 7 is a flowchart showing initialization processing R1.

Upon starting the initialization processing (R1) shown in FIG. 7, the CPU 30 sets initial values to the device controller 34, the AFE, 35, and the image processor 36 (RA1). Specifically, the CPU 30 acquires, from the flash ROM 33, the setting values of the clock signal CLK and the serial-in signal SI which correspond to a reading resolution of 300 DPI in the main scanning direction MD and a reading resolution of 300 DPI in the sub-scanning direction SD, and sets the acquired values to the device controller 34. The CPU 30 acquires, from the flash ROM 33, setting values for reading with a reading resolution of 300 DPI in the main scanning direction MD and a reading resolution of 300 DPI in the sub-scanning direction SD, and sets the acquired values to the AFE 35. The CPU 30 sets the line count number LN of the image processor 36 to "0". The CPU 30 transmits a command to the driving circuit 37 to move the reader 20 to the home position HP.

The CPU 30 acquires the black data BSD (RA2). Specifically, the CPU 30 stores one-line black data BSD in the black data BSD memory 474. The one-line black data BSD is one-line digital data DD which is obtained by controlling the AFE 35 to convert the analog data read by the reader 20 while the light source 21 is turned off. In this case, the one-line black data BSD is the black data BSD ranging from the leading pixel to the final pixel of one line, and is stored in the black data BSD memory 474 in the order from the leading pixel to the final pixel.

The CPU 30 acquires the first white data WSD1 (RA3). Specifically, the CPU 30 controls the reader 20 to read analog data by reading reflected light of light of the first color from the light source 21 with which the reference member BM is irradiated. The CPU 30 then controls the AFE, 35 to convert the analog data into the digital data DD, and stores, in the first white data WSD1 memory 484, the one-line first white data WSD1 calculated by subtracting the black data BSD of each pixel in one line from the digital data DD of each pixel in one line. In this case, as shown in FIG.

8, the first color of light from the light source 21 corresponds to the first color data C1D output during the period of the first line in the reading line CL undergoing the reading operation. This color corresponds to one of red light, green light, and blue light of the light source 21.

Figure 8:
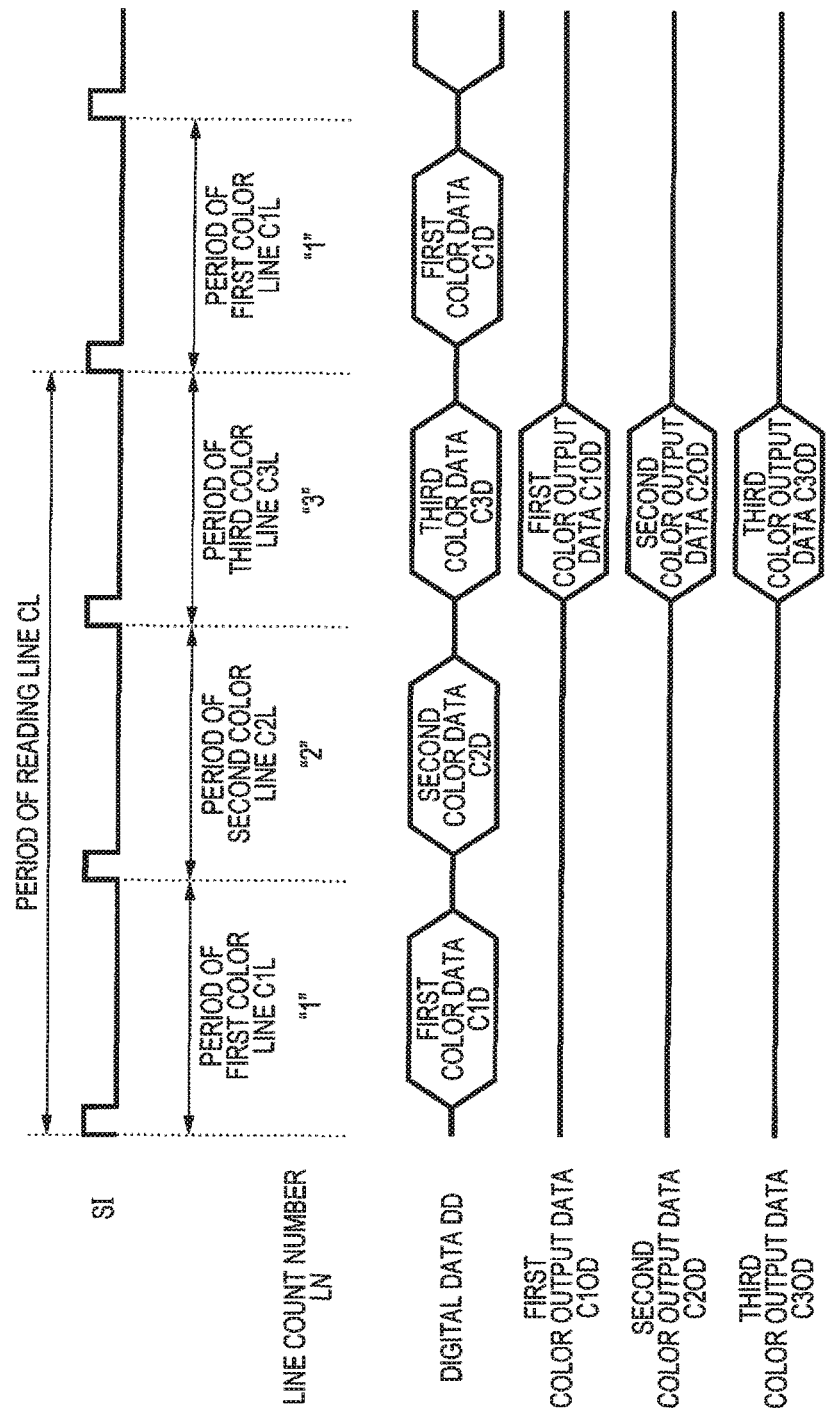
FIG. 8 is a timing chart showing the timings of a reading line CL, a line count number LN, and various types of data.

The CPU 30 acquires the second white data WSD2 (RA4). Specifically, the CPU 30 controls the reader 20 to read analog data by reading reflected light of light of the second color from the light source 21 with which the reference member BM is irradiated. The CPU 30 then controls the AFE 35 to convert the analog data into the digital data DD, and stores, in the second white data WSD2 memory 485, the one-line second white data WSD2 calculated by subtracting the black data BSD of each pixel in one line from the digital data DD of each pixel in one line. In this case, as shown in FIG. 8, the second color of the light source 21 corresponds to the second color data C2D output during the period of the second line in the reading line CL undergoing the reading operation, and is any one of two of red light, green light, and blue light from the light source 21 from which the first color of light is excluded.

The CPU 30 acquires the third white data WSD3 (RA5). Specifically, the CPU 30 controls the reader 20 to read analog data by reading reflected light of light of the third color from the light source 21 with which the reference member BM is irradiated. The CPU 30 then controls the AFE, 35 to convert the analog data into the digital data DD, and stores, in the third white data WSD3 memory 486, the one-line third white data WSD3 calculated by subtracting the black data BSD of each pixel in one line from the digital data DD of each pixel in one line. Upon ending the processing RA5, the initialization processing R1 ends. In this case, as shown in FIG. 8, the third color of light from the light source 21 corresponds to the third color data C3D output during the period of the third line in the reading line CL undergoing the reading operation. This color corresponds to the remaining color of light obtained by removing the first color light and the second color light from the red light, the green light, and the blue light from the light source 21. In the above-described processing RA3 to RA5, the first color, the second color, and the third color are red, green, and blue, respectively, for example. Needless to say, this sequence of three colors may be changed arbitrarily.

Specific Example

The process of storing the first color output data C1OD, the second color output data C2OD, and the third color output data C3OD in the RAM 32 will be described with a specific example with reference to FIGS. 8, 9, and 10.

As shown in FIG. 8, a period during which the line count number LN is "1" corresponds to the period of a first color line C1L. This period is the period of the first line in the period of the reading line CL. The switcher 42 stores the digital data DD obtained at this time as the first color data C1D in the first line memory 43.

A period during which the line count number LN is "2" corresponds to the period of a second color line C2L. This period is the period of the second line in the period of the reading line CL. The switcher 42 stores the digital data DD obtained at this time as the second color data C2D in the second line memory 44.

A period during which the line count number LN is "3" corresponds to the period of a third color line C3L. This period is the period of the third line in the period of the reading line CL. The switcher 42 transmits the digital data DD obtained in this period as the third color data C3D to the equivalence determiner 45 and the third black corrector 473. At this time, the first replacer 491, the second replacer 492, and the third replacer 493 store the first color output data C1OD, the second color output data C2OD, and the third color output data C3OD in the RAM 32.

Figure 9:
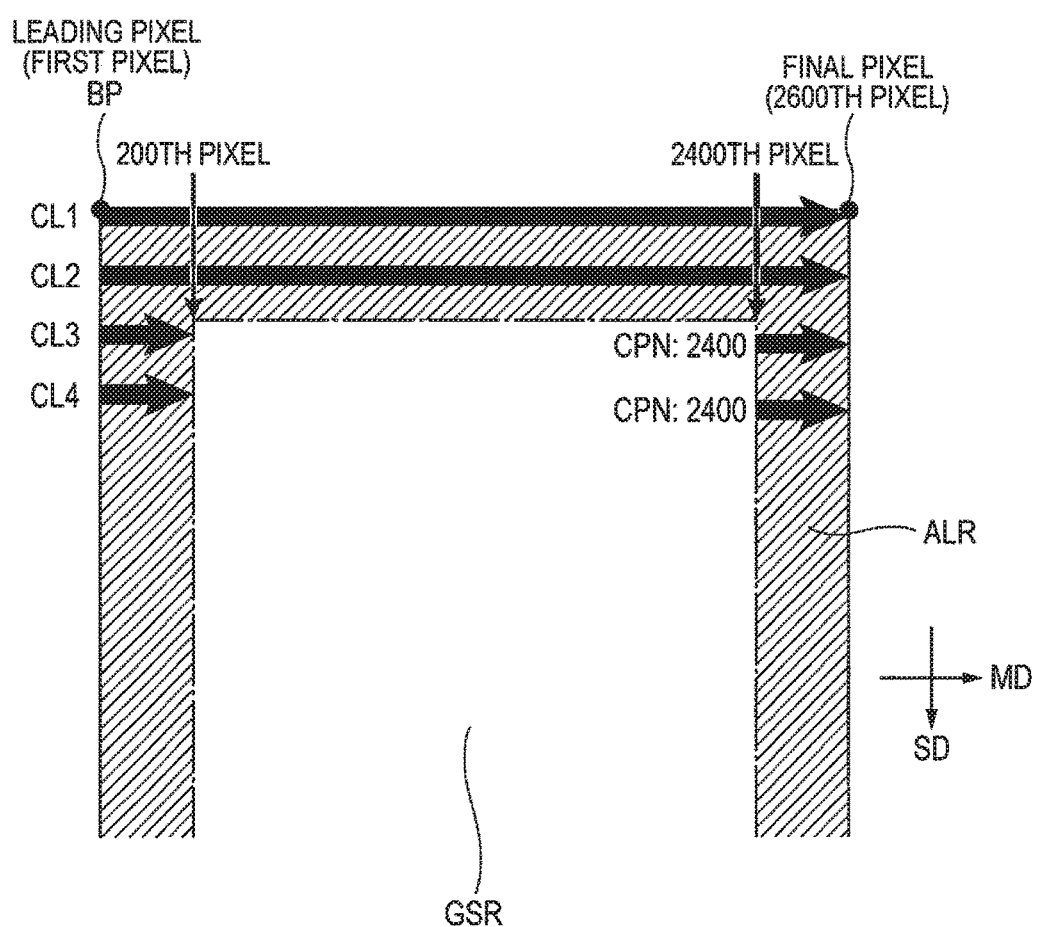
FIG. 9 is a view showing the positional relationship between each reading line CL, an outside light region ALR, and an original document region GSR in a state where an original document GS is placed.

With reference to FIG. 9, the process of converting the first color output data C1OD, the second color output data C2OD, and the third color output data C3OD in the first reading line CL1 as the first reading line CL will be described. Referring to FIG. 9, the hatched region is a region on which the original document GS is not supported, and is an outside light region ALR on which the outside light is incident. The region inside the single-dot chain line is an original document region GSR on which the original document GS is supported. The position of the first reading line CL1 corresponds to the position at which the original document GS is not placed, and hence no reflected light occurs at the position regardless of the color of light emitted from the 21. Accordingly, the digital data DD is obtained by reading the same outside light, and hence the first color data C1D, the second color data C2D, and the third color data C3D have the same value.

The processing operation of the equivalence determiner 45 in the first reading line CL1 will be described below. Each time the pixel number PN is input since the pixel number PN of "1" is input, the first position determiner 55 transmits the "ON" second equivalence flag CFG2. The second comparator 57 receives the "ON" second equivalence flag CFG2 from the first position determiner 55 each time the pixel number PN is input. Since the first color data C1D, the second color data C2D, and the third color data C3D all have the same value, the second comparator 57 transmits the white value WD as the replacement correction value DCV to the first replacer 491, the second replacer 492, and the third replacer 493. When the first color white correction data C1WD is input, since the replacement correction value DCV is input from the second comparator 57, the first replacer 491 stores the replacement correction value DCV as the first color output data C1OD in the RAM 32. When the second color white correction data C2WD is input, since the replacement correction value DCV is input from the second comparator 57, the second replacer 492 stores the replacement correction value DCV as the second color output data C2OD in the RAM 32. When the third color white correction data C3WD is input, since the replacement correction value DCV is input from the second comparator 57, the third replacer 493 stores the replacement correction value DCV as the third color output data C3OD in the RAM 32. In this manner, the first color output data C1OD, the second color output data C2OD, and the third color output data C3OD in the first reading line CL1 are all converted into the replacement correction values DCV and stored in the RAM 32.

Next, the process of converting the first color output data C1OD, the second color output data C2OD, and the third color output data C3OD in a third reading line CL3 as the third reading line CL will be described. The third reading line CL3 is the reading line CL when the original document GS is placed on the 201st to 2399th pixels in the main scanning direction MD. Accordingly, no reflected light occurs at the pixels from the leading pixel to the 200th pixel in the main scanning direction MD regardless of the color of light emitted from the light source 21, and the same outside light is always read to obtain the digital data DD. As a consequence, the first color data C1D, the second color data C2D, and the third color data C3D have the same value. At the pixels from the 201st pixel to the 2399th pixel in the main scanning direction MD, the original document GS is irradiated with light of each color from the light source 21, and the reflected light of light of each color from the light source 21 is read. Accordingly, the first color data C1D, the second color data C2D, and the third color data C3D have different values. At the pixels from the 2400th pixel to the 2600th pixel as the final pixel in the main scanning direction MD, like the pixels from the leading pixel to the 200th pixel, the first color data C1D, the second color data C2D, and the third color data C3D have the same value.

The processing operations of the equivalence determiner 45 and the position memory 46 in the third reading line CL3 will be described below. Each time the pixel number PN is input since the pixel number PN of "1" is input, the first position determiner 55 transmits the "ON" second equivalence flag CFG2. The second comparator 57 receives the "ON" second equivalence flag CFG2 from the first position determiner 55 each time the pixel number PN is input at each of the pixels from the leading pixel to the 200th pixel in the main scanning direction MD. In addition, since the first color data C1D, the second color data C2D, and the third color data C3D all have the same value, the second comparator 57 transmits the white value WD as the replacement correction value DCV. At the 201st pixel in the main scanning direction MD, when the pixel number PN is input, since at least two of the first color data C1D, the second color data C2D, and the third color data C3D have different values, the second comparator 57 transmits the stop signal HS to the first position determiner 55. In response to input of the stop signal HS, the first position determiner 55 transmits the "OFF" second equivalence flag CFG2 up to the final pixel each time the pixel number PN is input.

In response to input of the pixel number PN at the 2399th pixel in the main scanning direction MD, since the first color data C1D and the second color data C2D have different values, the first comparator 53 turns off the first equivalence flag CFG1, and then transmits the first equivalence flag CFG1, the pixel number PN, and the line count number LN to the position memory 46. In response to input of the pixel number PN at each of the pixels from the 2400th pixel to the 2600th pixel in the main scanning direction MD, since the first color data C1D and the second color data C2D have the same value, the first comparator 53 turns on the first equivalence flag CFG1, and then transmits the first equivalence flag CFG1, the pixel number PN, and the line count number LN to the position memory 46. Since the "OFF" first equivalence flag CFG1 is input from the first comparator 53 at the 2399th pixel in the main scanning direction MD, the position memory 46 deletes the equivalence pixel number CPN. Since the "ON" first equivalence flag CFG1 is input from the first comparator 53 at the 2400th pixel in the main scanning direction MD and the equivalence pixel number CPN is not stored in the position memory 46, the position memory 46 stores "2400" as the equivalence pixel number CPN.

The second position determiner 56 turns on the third equivalence flag CFG3 at each of the pixels from the 2400th pixel corresponding to the equivalence pixel number CPN to the 2600th pixel, and transmits the third equivalence flag CFG3 to the second comparator 57. Since the "ON" third equivalence flag CFG3 is input from the second position determiner 56 at each of the pixels from the 2400th pixel to the 2600th pixel in the main scanning direction MD and the first color data C1D, the second color data C2D, and the third color data C3D have the same value, the second comparator 57 transmits the white value WD as the replacement correction value DCV. In response to input of the first color white correction data C1WD at each of the pixels from the first pixel to the 200th pixels in the main scanning direction MD and each of the pixels from the 2400th pixel to the 2600th pixel in the main scanning direction MD, since the replacement correction value DCV is input, the first replacer 491 stores the replacement correction value DCV as the first color output data C1OD in the RAM 32. In response to input of the first color white correction data C1WD at each of the pixels from the 201st pixel to the 2399th pixel in the main scanning direction MD, since the replacement correction value DCV is not input, the first replacer 491 stores the first color white correction data C1WD as the first color output data C1OD in the RAM 32. In response to input of the second color white correction data C2WD at each of the pixels from the first pixel to the 200th pixel in the main scanning direction MD and each of the pixels from the 2400th pixel to the 2600th pixel in the main scanning direction MD, since the replacement correction value DCV is input, the second replacer 492 stores the replacement correction value DCV as the second color output data C2OD in the RAM 32.

In response to input of the second color white correction data C2WD at each of the pixels from the 201st pixel to the 2399th pixel in the main scanning direction MD, since the replacement correction value DCV is not input, the second replacer 492 stores the second color white correction data C2WD as the second color output data C2OD in the RAM 32. In response to input of the third color white correction data C3WD at each of the pixels from the first pixel to the 200th pixel in the main scanning direction MD and each of the pixels from the 2400th pixel to the 2600th pixel in the main scanning direction MD, since the replacement correction value DCV is input, the third replacer 493 stores the replacement correction value DCV as the third color output data C3OD in the RAM 32. In response to input of the third color white correction data C3WD at each of the pixels from the 201st pixel to the 2399th pixel in the main scanning direction MD, since the replacement correction value DCV is not input, the third replacer 493 stores the third color white correction data C3WD as the third color output data C3OD in the RAM 32.

Effects of Embodiment

In this embodiment, in response to input of the pixel number PN when the second equivalence flag CFG2 or the third equivalence flag CFG3 is ON, if the first color data C1D, the second color data C2D, and the third color data C3D have the same value, the second comparator 57 transmits the white value WD as the replacement correction value DCV to the first replacer 491, the second replacer 492, and the third replacer 493. In response to input of the first color white correction data C1WD, the first replacer 491 stores the replacement correction value DCV as the first color output data C1OD in the RAM 32, when the replacement correction value DCV is input, and stores the first color white correction data C1WD as the first color output data C1OD in the RAM 32 when the replacement correction value DCV is not input. In response to input of the second color white correction data C2WD, the second replacer 492 stores the replacement correction value DCV as the second color output data C2OD in the RAM 32 when the replacement correction value DCV is input, and stores the second color white correction data C2WD as the second color output data C2OD in the RAM 32 when the replacement correction value DCV is not input. In response to input of the third color white correction data C3WD, the third replacer 493 stores the replacement correction value DCV as the third color output data C3OD in the RAM 32 when the replacement correction value DCV is input, and stores the third color white correction data C3WD as the third color output data C3OD in the RAM 32 when the replacement correction value DCV is not input. Accordingly, when the replacement correction value DCV is input, the first replacer 491, the second replacer 492, and the third replacer 493 store the replacement correction value DCV as output data in the RAM 32. This makes it possible to remove the influence of outside light by detecting a pixel in which the first color data C1D, the second color data C2D, and the third color data C3D have the same value without turning off the light source.

The first position determiner 55 turns on the second equivalence flag CFG2 and transmits it to the second comparator 57 until the stop signal HS is input after the pixel number PN of "1" is input. The second comparator transmits the stop signal HS to the first position determiner 55 when the second equivalence flag CFG2 is ON and at least two of the first color data C1D, the second color data C2D, and the third color data C3D have different values. The second position determiner 56 turns on the third equivalence flag CFG3 and transmits the third equivalence flag CFG3 to the second comparator 57 after the pixel number PN of the equivalence pixel number CPN is input and until the pixel number PN of "2600" is input. Accordingly, the second comparator 57 does not transmit the replacement correction value DCV until the pixel number PN of the equivalence pixel number CPN is input after the stop signal HS is input. This suppresses the possibility of erroneously detecting a pixel in the original document as a pixel in which the first color data C1D, the second color data C2D, and the third color data C3D have the same value, thereby removing the influence of outside light. That is, the pixels in the outside light region ALR are appropriately replaced with the replacement correction value DCV without erroneously replacing the pixels in the original document region GSR.

In response to input of the pixel number PN when the line count number LN is "2," the first comparator 53 turns on the first equivalence flag CFG1 and transmits the first equivalence flag CFG1, the pixel number PN, and the line count number LN to the position memory 46 when the first color data C1D and the second color data C2D have the same value, and turns off the first equivalence flag CFG1 and transmits the first equivalence flag CFG1, the pixel number PN, and the line count number LN to the position memory 46 when the first color data C1D and the second color data C2D have different values. In response to input of the "ON" first equivalence flag CFG1 from the equivalence determiner 45 when the line count number LN is "2," the position memory 46 stores the pixel number PN input from the equivalence determiner 45 as the equivalence pixel number CPN in the position memory 46 when the equivalence pixel number CPN is not stored, and when the equivalence pixel number CPN is stored, maintains the stored equivalence pixel number CPN in the position memory 46. In response to input of the "OFF" first equivalence flag CFG1 when the line count number LN is "2," the position memory 46 deletes the stored equivalence pixel number CPN from the position memory 46. Accordingly, the position memory 46 stores, as the equivalence pixel number CPN, the pixel number PN of the pixel at which at least two of the first color data C1D, the second color data C2D, and the third color data C3D differ first among pixels located upstream of the final pixel in the main scanning direction when the pixels are viewed in an upstream direction from the final pixel toward the leading pixel. This suppresses the possibility of erroneously detecting a pixel in the original document as a pixel in which the first color data C1D, the second color data C2D, and the third color data C3D have the same value, thereby removing the influence of outside light. That is, the pixels in the outside light region ALR are appropriately replaced with the replacement correction value DCV without erroneously replacing the pixels in the original document region GSR.

The image scanner SM, the document table DT, the reference member BM, and the document cover CV are nonlimiting examples of an image scanner, a document table, a reference member, and a document cover. The light source 21 is a nonlimiting example of a light source. The rod lens 24, the light receiver 22, and the AFE 35 are a nonlimiting example of a reader. The driving circuit 37, the conveyance motor MT, and the movement mechanism MM are a nonlimiting example of a mover. The first white data WSD1 memory 484, the second white data WSD2 memory 485, the third white data WSD3 memory 486, and the position memory 46 are a nonlimiting example of a memory. The CPU 30 that executes the initialization processing R1 is a nonlimiting example of a correction data acquisition unit. The CPU 30 that executes the processing R2 to R4 relating to the reading operation is a nonlimiting example of an original document data acquisition unit. The equivalence determiner 45 is a nonlimiting example of an original document non-existence determiner. The first white corrector 481, the second white corrector 482, the third white corrector 483 are nonlimiting examples of a corrector. The first replacer 491, the second replacer 492, and the third replacer 493 are nonlimiting examples of a replacer. The image processor 36 is a nonlimiting example of a circuit.

The first position determiner 55 and the second comparator 57 are nonlimiting examples of a first determiner. The second position determiner 56 and the second comparator 57 are nonlimiting examples of a second determiner. The first comparator 53 is a nonlimiting example of a two-color equivalence determiner. The second comparator 57 is a nonlimiting example of a stop command transmitter.

While the disclosure has been described in detail with reference to the above aspects thereof, it would be apparent to those skilled in the art that various changes and modifications may be made therein without departing from the scope of the claims.

(1) The image scanner SM according to this embodiment may be applied to a multifunction peripheral including a printer unit. In addition, the embodiment has exemplified the case in which the reader 20 is formed from a CIS. However, the reader 20 may be formed from a CCD unit on which a charge coupled device (CCD) is mounted and which moves in the sub-scanning direction or may be formed from a reading unit configured such that a CCD element is fixed and a light source and a mirror move in the sub-scanning direction.

(2) In this embodiment, the second comparator 57 transmits the white value WD as the replacement correction value DCV. However, the second comparator 57 may transmit a different value. For example, the background color of the original document GS may be acquired in advance, and the acquired background color may be transmitted as the replacement correction value DCV. In this case, if the acquired background color is closer to white than the first color data C1D, the second color data C2D, and the third color data C3D, the background color is transmitted as the replacement correction value DCV.

(3) In this embodiment, the replacement correction value DCV is transmitted when the line count number LN of "3" is input and the first color data C1D when the line count number LN is "1," the second color data C2D when the line count number LN is "2," and the third color data C3D when the line count number LN is "3" all have the same value. However, the embodiment may use a different method. The embodiment may be configured to always store the digital data DD of two lines adjacent on the upstream side in the sub-scanning direction SD and transmit the replacement correction value DCV in response to input of the digital data DD when the input digital data DD and the digital data DD of two lines adjacent on the upstream side in the sub-scanning direction SD all have the same value. In this case, since the light source 21 continuously emits light of different colors, the three digital data DD to be compared are three-line digital data DD of red, green, and blue.

(4) In this embodiment, the first position determiner 55 turns on the second equivalence flag CFG2 and transmits the second equivalence flag CFG2 after the pixel number PN of "1" is input and until the stop signal HS is input. However, the embodiment may use a different method. The first position determiner 55 may turn on the second equivalence flag CFG2 and transmit the second equivalence flag CFG2 after the pixel number PN of "1" is input and until at least two of the first color data C1D, the second color data C2D, and the third color data C3D become different in value.

(5) In this embodiment, the second position determiner 56 turns on the third equivalence flag CFG3 and transmits the third equivalence flag CFG3 after the pixel number PN of the equivalence pixel number CPN is input and until the final pixel. However, the embodiment may use a different method. When the first color data C1D, the second color data C2D, and the third color data C3D are continuously equal after the color data C1D, C2D, and C3D become equal and until the final pixel, the third equivalence flag CFG3 may be turned on and transmitted for all the pixels at which the color data C1D, C2D, and C3D are equal. In this case, it is necessary to store the first color white correction data C1WD, the second color white correction data C2WD, and the third color white correction data C3WD in the image processor 36 after the first color data C1D, the second color data C2D, and the third color data C3D become equal and until the final pixel.

(6) The image scanner of this disclosure may be applied to a coverless scanner that does not have a document cover.

What is claimed is:

1. An image scanner comprising:
   a document table configured to support an original document;
   a light source configured to emit light of each of three colors of red, green, and blue;
   an image sensor extending in a main scanning direction and configured to receive light of at least one of the three colors emitted from the light source and to generate read image data that is pixel data of a plurality of pixels corresponding to at least one of the three colors;
   a mover configured to move the image sensor along a sub-scanning direction perpendicular to the main scanning direction;
   a reference member having density serving as a reference of data indicative of white color;
   a memory; and
   a circuit configured to:
      acquire, as white correction data, the read image data that is generated by reading an image of the reference member when light of each of the three colors of the light source is sequentially emitted to the reference member and store the white correction data in the memory, the white correction data including red white correction data that is the read image data generated when red light of the light source is emitted to the reference member, green white correction data that is the read image data generated when green light of the light source is emitted to the reference member, and blue white correction data that is the read image data generated when blue light of the light source is emitted to the reference member;
      acquire, as original document image data, the read image data that is generated by moving the image sensor and by reading, with the image sensor, an image of the original document supported by the document table, the original document image data including original document image red data that is the read image data generated when red light of the light source is emitted to the original document, original document image green data that is the read image data generated when green light of the light source is emitted to the original document, and original document image blue data that is the read image data generated when blue light of the light source is emitted to the original document;
      determine, as an original document non-existence position, a position of a pixel at which all of the original document image red data, the original document image green data, and the original document image blue data have a same value;
      convert the original document image data to output image data by performing shading correction on the original document image data based on the white correction data stored in the memory, the output image data including output image red data that is obtained by performing shading correction on the original document image red data based on the red white correction data, output image green data that is obtained by performing shading correction on the original document image green data based on the green white correction data, and output image blue data that is obtained by performing shading correction on the original document image blue data based on the blue white correction data; and
      replace the output image data at the original document non-existence position with a value closer to the data indicative of white color than a value of the output image data.

2. The image scanner according to claim 1, wherein the image sensor is configured to generate the read image data that is pixel data of the plurality of pixels ranging from a leading pixel to a final pixel in the main scanning direction, a position of the final pixel being downstream of a position of the leading pixel in the main scanning direction; and
   wherein the circuit is further configured to determine, as the original document non-existence position, a position of pixels between the leading pixel and first non-equivalence pixel, the first non-equivalence pixel being a pixel at which at least two of the original document image red data, the original document image green data, and the original document image blue data differ first among pixels located downstream of the leading pixel in the main scanning direction.

3. The image scanner according to claim 2, wherein the circuit is further configured to determine, as the original document non-existence position, a position of pixels between second non-equivalence pixel and the final pixel, the second non-equivalence pixel being a pixel at which at least two of the original document image red data, the original document image green data, and the original document image blue data differ first among pixels located upstream of the final pixel in the main scanning direction when the pixels are viewed in an upstream direction from the final pixel toward the leading pixel.

4. The image scanner according to claim 3, wherein the circuit is further configured to:
   acquire, as original document image first color data, one of the original document image red data, the original document image green data, and the original document image blue data;
   after acquiring the original document image first color data, acquire, as original document image second color data, one of the original document image red data, the original document image green data, and the original document image blue data excluding the original document image first color data; and
   after acquiring the original document image second color data, acquire, as original document image third color data, one of the original document image red data, the original document image green data, and the original document image blue data excluding the original document image first color data and the original document image second color data;
   each time the original document image second color data is acquired from the leading pixel to the final pixel, determine whether the original document image first color data and the original document image second color data have a same value;
   in response to determining that the original document image first color data and the original document image second color data have the same value, store, in the memory, a position of a pixel having the same value as an equivalence pixel position;
   in response to determining that the original document image first color data and the original document image second color data do not have the same value, delete the equivalence pixel position from the memory; and
   when acquiring the original document image third color data from a pixel of the equivalence pixel position to the final pixel, determine, as the original document non-existence position, a position of a pixel at which all of the original document image first color data, the original document image second color data, and the original document image third color data have a same value.

5. The image scanner according to claim 4, wherein the circuit is further configured to:
   generate a stop command when there is a pixel at which at least two of the original document image red data, the original document image green data, and the original document image blue data differ first among pixels located downstream of the leading pixel in the main scanning direction;
   start determining the original document non-existence position in response to acquiring the original document image third color data of the leading pixel; and
   stop determining the original document non-existence position in response to receiving the stop command.

6. The image scanner according to claim 4, wherein the circuit is further configured to:
   start determining the original document non-existence position in response to acquiring the original document image third color data of the pixel at the equivalence pixel position; and
   stop determining the original document non-existence position, after determining the original document non-existence position when acquiring the original document image third color data of the final pixel.

7. The image scanner according to claim 1, further comprising:
   a document cover configured to open and close between a closed position at which the document table is covered and an open position at which the document table is exposed; and
   a cover sensor configured to turn on and off depending on whether the document cover is at the closed position or at the open position,
   wherein the circuit is configured to, in response to detecting that the document cover is at the open position, acquire the white correction data, acquire the original document image data, determine the original document non-existence position, convert the original document image data to the output image data, and replace the output image data at the original document non-existence position.

* * * * *